United States Patent
Rabl

[11] 3,726,458
[45] Apr. 10, 1973

[54] DEVICE FOR THE INTERMITTENT FEED OF A WIDTH OF MATERIAL
[75] Inventor: Richard Rabl, Vienna, Austria
[73] Assignee: Akkumulatorenfabrik Dr. Leopold Jungfer, Karnten, Austria
[22] Filed: July 12, 1971
[21] Appl. No.: 161,800

[30] Foreign Application Priority Data
  July 17, 1970  Austria.................................6562/70

[52] U.S. Cl. ...................226/141, 226/146, 226/159
[51] Int. Cl. ............................................B65h 17/26
[58] Field of Search.....................226/141, 146, 150, 226/159, 158, 160

[56] References Cited
UNITED STATES PATENTS
3,580,449  5/1971  Chabian..............................226/150
3,429,493  2/1969  Lehmann............................226/150
1,707,943  4/1929  Pocovi................................226/160 X Primary Examiner—Richard A. Schacher
Assistant Examiner—Gene A. Church
Attorney—Ernest F. Marmorek

[57] ABSTRACT

A feed device for strip material has a reciprocable arm which is moved in a feed direction by a first pneumatic ram and in a return direction by a second pneumatic ram. The arm has a clamp for holding the material during feed movement and a further clamp located at the end of the feed movement of the arm to hold the material during return movement of the ram. The first ram has a stop for limiting the feed movement and the second ram has both a stop for limiting return movement and a device for braking movement of the member towards the end of the return movement.

1 Claim, 4 Drawing Figures

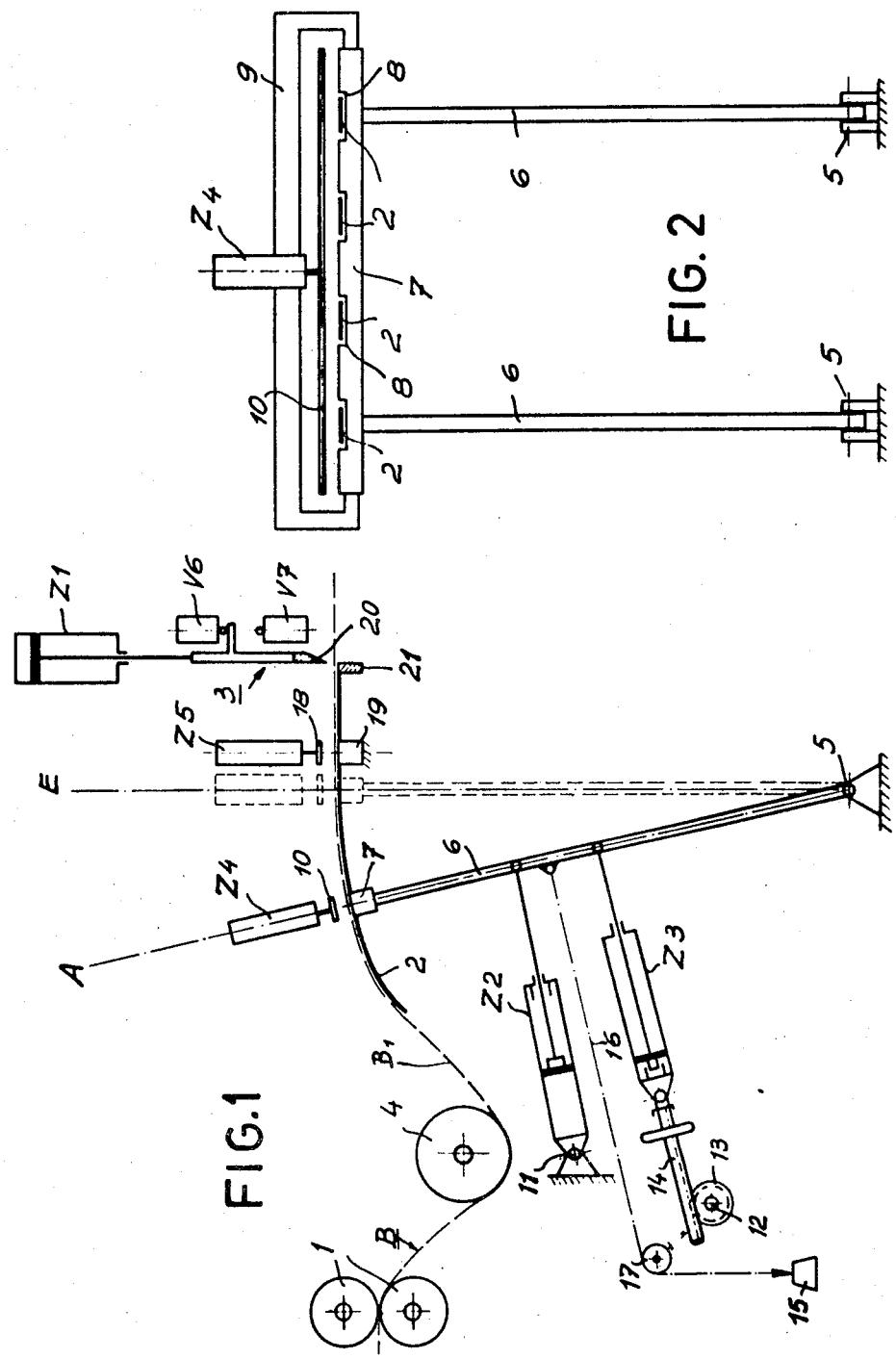

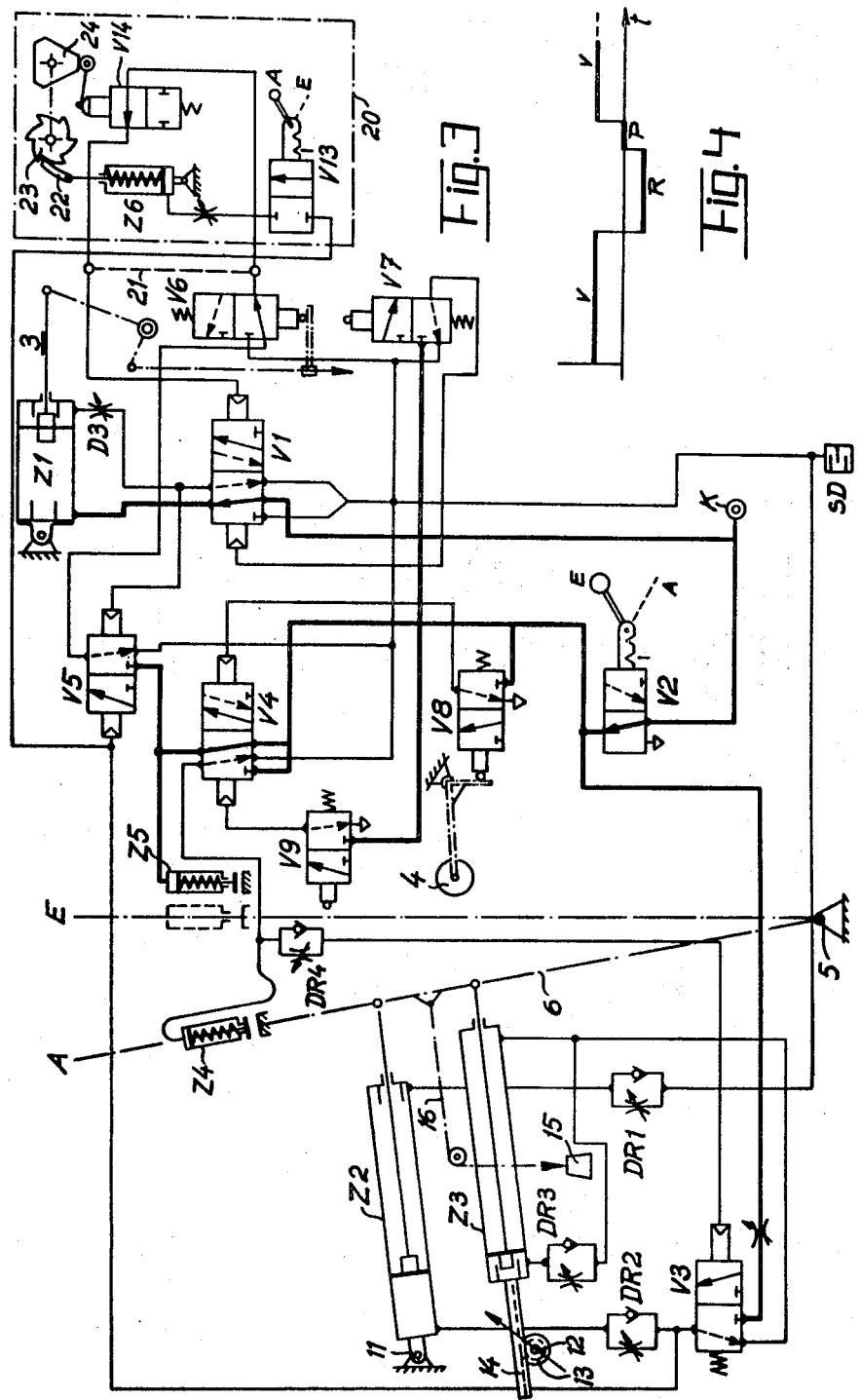

DEVICE FOR THE INTERMITTENT FEED OF A WIDTH OF MATERIAL

The present invention relates to a feed device for strip material in which the material is transported by a reciprocable member from an initial position to a working position where it is held whilst the reciprocable member returns to the initial position.

In the known devices of this type, which feed sheet metal to stamping machines or the like, the entrainment member, for example in the form of a sliding carriage, is driven by a double-acting pneumatic cylinder which is controlled by the machine tool and the opposite sides of the piston of the cylinder are alternately acted upon with compressed air so as to produce the feed and return movements; the two clamping devices can in this case also be controlled pneumatically and can also be alternately acted upon by compressed air in synchronism with the operation of the pneumatic cylinder.

The present invention has the object of providing an intermittent feed device of the above-mentioned type, which uses a pneumatic cylinder of simple construction, and in which the length of feed travel can be varied according to any particular requirement and the drive pistons can be braked both at the end of the feed movement and at the end of the return movement, so that the device operates substantially free from vibrations and shocks and is therefore suitable for feeding delicate materials. In particular the device according to the invention is used for the feed of a sintered sheet continuously emerging from a sintering furnace, which sheet must be intermittently fed to a cutter so as to be cut into predetermined lengths to form sinter plates, such as are used for example as separators for electric storage batteries.

This object is achieved by providing a reciprocable entrainment member reciprocable between an initial position and a feed position. A first clamping device is mounted on the entrainment member for clamping the material against the entrainment member whilst it moves to the feed position. A second clamping device for clamping the material during the return movement of the entrainment device, is also provided adjacent the feed position of the entrainment device. First and second pneumatic rams for respectively moving the entrainment member towards, and stopping it at the feed position, and braking the entrainment member during return movement to the initial position are further provided, the positions of the ram cylinders being adjustable relative to one another.

By using two separate damped pneumatic cylinders for the travel limitation of the entrainment member during feed or during return movement, braking is obtained at the end of both the feed and return strokes, the braking still being operable when the cylinders are adjusted to give the desired feed movement. The feed movement of the entrainment member as already mentioned is effected by the first pneumatic cylinder; the return movement can be effected by supplying compressed air to the cylinder at the side opposite to which it is supplied to effect the feed stroke or by supplying the second piston with compressed air or by a weight.

In order to be able to feed a length of material which exceeds the capability of the feed device, the machine tool is activated after several feed thrusts and for this purpose there is provided in the control circuit of the machine tool a pneumatically actuated step-by-step switch.

One embodiment of the invention will now be described by way of example with reference to the accompanying drawings, in which:

FIG. 1 shows a schematic representation of a device for intermittently feeding short material together with the drive means and control members;

FIG. 2 is a view of the entrainment member in its end position, viewed in the direction of feed;

FIG. 3 shows the same components as in FIG. 1 together with their pneumatic control circuits, and FIG. 4 represents the operating sequence per unit time of one working cycle of the device.

The pneumatic feed device as will hereinafter be described can be used to intermittently feed a width of material B which has just passed continuously through a tunnel kiln and fused together in this from a plastics powder layer. The material is fed to a pneumatically operated cutter which cuts off the required lengths from the sintered sheet, which lengths are suitable for use as separators for electric storage batteries for example.

The width of material B (see FIG. 1) is fed continuously from a pair of driven rolls 1 situated in the tunnel kiln outlet, and is passed between this pair of rolls and over the curved feed guides 2, which are situated in the feed path, to the cutter 3. A compensating roller 4, which lies over the material B, is provided and operates as will be hereinafter described.

The intermittent feed movement of the material B is effected by means of a frame 6 acting as entrainment member which is pivotably supported at lower support bases 5 (see FIG. 2). The frame 6 carries on its upper free end a cross-beam 7 the upper side of which is provided with grooves 8 for accommodating the feed guides 2. The cross-beam 7 is straddled by a cross-tie 9 on which there is mounted a pneumatic clamping cylinder Z4 the piston of which carries a clamping strip 10 which in its operative position lies adjacent the cross-beam 7, so that the width of material B can be tightly clamped between the cross-beam 7 and the clamping strip 10 due to the pressure exerted by the cylinder Z4, whereby the width of material is compelled to follow the movement of the entrainment member 6.

The piston rods of two further pneumatic cylinders Z2 and Z3 engage the entrainment member 6, the pneumatic cylinders being pivotably supported on the machine frame. The cylinder Z2 effects and limits the forward movement of the entrainment member and is pivoted on a fixed spindle 11. The cylinder Z3 limits the return movement of the entrainment member ans is supported on a fixed spindle 12. The relative distance between the cylinder Z3 and the spindle 12 can be varied by means of a control gear which has been shown diagrammatically by a rack 14 and pinion 13, the pinion being arranged on the spindle 12 and is adjustable by means of a hand-wheel. As may be seen the cylinder Z2 is provided with damping means, so that its piston and therefore the entrainment member is braked when the latter reaches its end position which is indicated by the broken line E. Moreover the cylinder Z3 remote from the entrainment member 6 is also provided with damping means so that the piston of this cylinder and therefore the entrainment member is braked when the latter, during return movement, reaches the initial position which is indicated by the broken line A. The initial position of the entrainment member, or the length of its feed travel, is variable by variation of the control gear.

The return movement of the entrainment member is effected for example by a weight 15 which is attached to the entrainment member 6 by a pull cable 16 running over a roller 17.

Adjacent the position E of the entrainment member 6, there is situated a stationary pneumatic clamping cylinder Z5 which, in alternation with the cylinder Z4, is acted on by compressed air such that the material B, after being advanced, is tightly clamped between a clamping strip 18, actuated by the cylinder Z5, and a cross-beam 19 fixed to the machine. As soon as the clamping action member of the cylinder Z4 is released, that of cylinder Z5 is activated.

After completion of the feed movement the cutter 3 is actuated, the movable blade 20 being lowered by means of a pneumatic cylinder Z1 toward the fixed blade 21. The reversal of the pneumatic cylinder Z1 upwards is effected by a valve V7 controlled by the piston of the cylinder and Z1. The control circuit for the next operating stroke of the cutter is primed after activation of valve V6 which is likewise controlled by the piston of cylinder Z1.

The pneumatic switch and control circuit diagram of the device described is represented in FIG. 3 in which K designates a compressor acting as a source of compressed air for supplying all pneumatically actuated parts of the feed device via a circuit closing valve V2, shown in the diagram in the on-position and which can be actuated and locked by hand. In the rest position as shown i.e. ready to transfer material, the pipes shown in thick lines carry compressed air. It may be seen that the compressed air acts via an air impulse valve V1 on the cylinder Z1 so as to hold the cutting blade in the raised position.

In addition air impulse valve V4 is supplied with compressed air, which valve in turn supplies cylinders Z4, Z5 of the movable or stationary clamping device respectively. In the position shown the stationary clamping cylinder Z5 is supplied so that the material is held in the position it reached after the last feed. The entrainment member 6 is situated in its initial position A, the clamping device being released since the pneumatic clamping cylinder Z4 is not under pressure and is held in the rest position by a spring.

The feed of the material is initiated by the compensating roller 4, which, when sufficient slack occurs in the width of material B temporarily reverses the valve V8, which again has a spring-return. In this way the air is supplied to valve V4 such that it is reversed. Air is now supplied to the clamping cylinder Z4 which is in position A and which now clamps the material.

The cylinder Z5 is not supplied with compressed air and the clamping action is released by a spring-return, the cylinder Z5 exhausting to atmosphere via a silencer SD.

Simultaneously with actuation of the clamping cylinder Z4 air passes through the choke of a choke/non-return valve combination DR4 to activate a valve V3. In the activated position the valve V3 admits compressed air via the non-return valve of a choke/non-return valve DR2 from valve V2 into the feed cylinder Z2 so as to transfer the entrainment member and the material from position A to position E. The feed movement is braked near its end position E by damping of the piston of the feed cylinder Z2 and finally halted; the right-hand side of the feed cylinder Z2 in FIG. 3 is connected here via a choke of a choke/non-return valve DR1 to exhaust via the silencer, SD.

On reaching the end position E the entrainment member 6 mechanically actuates the valve V9 which effects a resetting of the air impulse valve V4 into its rest position, which in turn causes the clamping cylinder V5 to be actuated, so that the advanced width of material is clamped, and the cylinder Z4 is exhausted via the silencer SD allowing return of the entrainment member 6 to position A.

Consequently the material width B to be cut is advanced or fed one stage and then, as will be described later, the cutter 3 can be brought into operation.

Now, as the line to the clamping cylinder Z4 is not under pressure, the control line of the air impulse valve V3 is not under pressure and the valve is returned to its rest position by its spring, in which position cylinder Z2 is no longer supplied with air but is vented via the choke DR2 to the silencer SD. It is now possible for the return movement of the entrainment member 6 to be effected by the weight 15. The brake cylinder Z3 serves here for the braking and as an end stop for the return movement, i.e., it defines the initial position A of the entrainment member 6. The left-hand side of the brake cylinder Z3 is connected via the choke of a choke/non-return valve combination DR3 to the silencer SD, and thus exhausts to atmosphere.

During the return movement of the entrainment member 6 the cutter 3 is brought into operation so as to cut off the end part of the material held by the clamping cylinder Z5. The intermittent mode of operation of the cutter is already preset during the feed movement of the entrainment member 6 by an air impulse valve V5. A control line is joined to the outlet line of the control valve V3 for the feed cylinder Z2 before the choke/non-return valve combination DR2, so that the valve V5, during the feed movement of the entrainment member 6, is activated and provides a path from the cylinder Z5 and from exhaust via valve V4, to a mechanically operated valve V6 and hence to the right-hand control line of the reversing valve V1, but as, at this point, air is not applied via valve V4 valve V1 is not activated.

Now as soon as air passes through valve V5 due to operation of the valve V9, to activate cylinder Z5 the path via the valve V5 is also supplied with compressed air, the air impulse valve V1 is reversed so as to activate cylinder Z1 and return the cutter to its rest position. For the path described the enclosed circuit component 20 in FIG. 3 may be considered to be replaced firstly by the line section 21 shown by dashes. The reversed valve V1 admits compressed air via a choke D3 on the right-hand side of the cutter cylinder Z1, to the cylinder Z1 to effect the return of the cutter and simultaneously connects the left-hand side of this cylinder Z1 via the silencer SD to the free atmosphere. Moreover due to a tapping between the choke D3 and the valve V1 compressed air is applied to the right-hand control line of the air impulse valve V5 and this valve is in this way regulated back from its prepared state into its interrupted state, so that in the work cycle described it is unable to enable any further working stroke of the cylinder Z1.

After the start of the operating movement of the cutter 3 the mechanically actuated valve V6 is reversed by its return spring so that a path is provided to the valve V7 and hence to exhaust, to vent both control inputs of the air impulse valve V1 in parallel, this valve retaining its position. As soon as the valve V7 is mechanically actuated by the lowering of the cutter the control line, of the valve V1 shown on the left-hand side in FIG. 3, is supplied with compressed air, so that the valve V1 is reversed and causes the cutter cylinder Z1 to be supplied with compressed air so as to effect the return movement of the cutter, whereupon the valve V7 is returned by a spring into its initial position. At the end of the upward movement of the cutter the valve V6 is mechanically actuated again, without however being able to initiate a further operating stroke of the cutter as the resetting of the preparative valve V5 has been reset.

A complete working cycle is thus ended, i.e., all components of the device are situated again in their initial position.

In the time graph in FIG. 4 the feed thrust is designated by V. The time taken by the feed thrust depends, as does the time for the subsequent return travel designated by R, on the particular length chosen for the feed travel A-E. A pause P follows the return travel until a new feed thrust V is initiated by the compensating roller 4. The pause P is necessary in order to be able to regulate the speed of travel of the material in the kiln to within fine limits, without the piston speed during the feed movement having to be reset. An increase in the speed of travel results in a shortening of the pause and vice-versa.

It will be appreciated that the return stroke of the entrainment member may be effected by compressed air supply to either of the cylinders Z2, Z3 and that the feed cycle may be initiated by the action of the cutter or the entrainment member instead of the compensating roller 4.

In the case of pliable materials the length of feed thrust cannot be any length desired because if the distance is too great the material tends to fold up when it is being fed. Moreover with increase in the feed length A-E a greater space requirement for the device is necessary as the cylinders Z2, Z3 must be made proportionately longer. This also results in a high loss of compressed air if short feed thrusts are to be effected with the long working cylinders. This difficulty can be eliminated by making the cutter actuable after a predetermined number of feed thrusts, the length of the feed thrusts being so selected for the cylinder Z3, using the control gear 13, 14, such that the length of the feed thrust times the number of thrusts between the individual operations of the machine tool is equal to the desired length. The selection of the number of feed thrusts, which lie between the individual operations of the working machine, is effected by the circuit indicated as 20 in FIG. 3. The air line 21 is not used in this circuit.

From the left-hand side of the air impulse valve V5 a control line is led via a valve V13, which is cut in when the circuit component 20 is placed in operation, via a choke to the lower side of a cylinder Z6, whereby this cylinder receives an air impulse with each stroke of the entrainment member 6, so that its spring-loaded piston is displaced and indexes a ratchet wheel 23 forward via a thrust pawl 22, whereupon the piston of the cylinder Z6, under its spring-loading, returns again into its initial position. An actuating member 24 for a roller lever valve V14 is connected to the ratchet wheel. This actuating member 24 has projections, the number of which is in an integral ratio to the number of teeth of the ratchet wheel; for example this ratio can be 6:3 (as shown), 6:2 or 6:1. The roller lever valve V14 is situated in the route between the valve V6 and the control line (right-hand side in FIG. 3) of the valve V1 and opens in each case after a predetermined angular rotation of the ratchet wheel 23.

If for example the maximum advance or feed of the entrainment member amounts to 20cm and if the material B is to be cut into 66cm long plates, then the stroke of the entrainment member 6 is set to 11 cm and a reduction ratio of 6:1 used.

This type of reduction can also be used in any other step-by-step gear (electric, hydraulic or purely mechanical), that is to say in connection with swinging or sliding entrainment members.

I claim:
1. A device for the intermittent feed of a width of material, for use in connection with a machine tool, comprising an entrainment member reciprocable between an initial position and a feed position, a first clamping device mounted on the entrainment member for clamping the material against the entrainment member during movement of the entrainment member towards the feed position, a second clamping device, means to mount the second clamping device adjacent the feed position of the entrainment device for clamping the material during the return movement of the entrainment member, a first pneumatic ram connected to the member for moving the member towards the feed position, the ram having stop means for stopping the member at the feed position and a second pneumatic ram connected to the entrainment member, the second ram having means to brake movement of the member towards the initial position and stop means to stop the member at the initial position and a device for adjusting the relative position of the two rams whereby feed travel of the member can be varied, a control circuit of the machine tool provided with a pneumatically actuated step-by-step switch which switch is arranged between an air impulse valve and a reversing valve for the operation and return movement of the machine tool, which switch, with each air impulse arriving via the air impulse valve, is indexed by a predetermined amount and is ready to actuate the control circuit of the reversing valve for the purpose of initiating a working stroke, after a predetermined or selectable number of air impulses have been received.

* * * * *